US006975417B1

(12) United States Patent  (10) Patent No.: US 6,975,417 B1
Hilpl et al.  (45) Date of Patent: Dec. 13, 2005

(54) DYNAMIC ADDITION OF PROGRAMMING CONFLICTS FOR PROGRAMMING CONFLICT CHECKING

(75) Inventors: R. Keith Hilpl, Skaneateles, NY (US); Patrick T. Igoe, Grand Island, NY (US); Patrick J. Waara, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/510,167

(22) Filed: Feb. 22, 2000

(51) Int. Cl.$^7$ .......................... G06F 13/00; G06K 13/00
(52) U.S. Cl. ..................... 358/1.15; 358/1.9; 358/1.16; 358/1.13
(58) Field of Search ....................... 358/1.2, 1.11–1.16, 358/1.9, 449, 451

(56) References Cited

U.S. PATENT DOCUMENTS

| 5,063,535 | A | | 11/1991 | Jacobs et al. ................. 714/46 |
| 5,260,805 | A | * | 11/1993 | Barrett ........................ 358/449 |
| 5,309,558 | A | | 5/1994 | Rourke et al. ............... 358/1.1 |
| 5,467,434 | A | * | 11/1995 | Hower, Jr. et al. ......... 358/1.15 |
| 5,592,881 | A | | 1/1997 | Rabjohns .................... 101/483 |
| 5,749,024 | A | | 5/1998 | Young .......................... 399/85 |
| 6,166,826 | A | * | 12/2000 | Yokoyama .................. 358/1.16 |
| 6,335,795 | B1 | * | 1/2002 | Neuhard et al. ............ 358/1.15 |

* cited by examiner

Primary Examiner—Gabriel Garcia
Assistant Examiner—Thierry L. Pham
(74) Attorney, Agent, or Firm—Oliff & Berridge, PLC

(57) ABSTRACT

A method to program a printer includes initiating a save conflict mode and saving a user defined conflict by either storing print job attributes in a conflict list while in the save conflict mode or storing at least one of a policy, a capability and a constraint based on the print job attributes while in the save conflict mode. One method to use a printer that has been so programmed includes receiving from a user at least one job attribute that causes a conflict, checking the at least one received job attribute against the stored print job attributes, determining whether a conflict condition exists, and displaying a conflict message when the conflict condition is determined to exist. Another method to use a printer that has been so programmed includes receiving from a user at least one job attribute that causes a conflict, checking for an itinerary to process a sheet according to the at least one received job attribute, determining whether an itinerary is unavailable due to a conflict condition, and displaying a conflict message when the itinerary is unavailable due to a conflict condition.

51 Claims, 5 Drawing Sheets

DYNAMIC ADDITION OF PROGRAMMING CONFLICTS FOR PROGRAMMING CONFLICT CHECKING

BACKGROUND OF THE INVENTION

1. Field of the Invention

The present invention relates to a method to program conflicts into a printing machine. In particular, the invention relates to a method to program user defined conflicts that would not otherwise be able to be identified as conflicts based on a priori information.

2. Description of Related Art

Modern printing systems offer a wide range of print media, marking and finishing options. Media can be paper of various sizes, color and surface properties as well as transparent media in various sizes, color tints and surface properties. Marking options include such variations as single or double sided printing, printing on a rotation angle, enlargement, reduction, multi-color or black, ink jet or laser, etc. Finishing options include various stapling options, other binding options, insertion of covers and tab sheets, etc.

Operators or users of printing systems enter the print job description into a job programming user interface, often a console of many popular forms. However, certain combinations of these operations are undesirable. For example, it makes no sense to specify staple binding for a single page print job. It usually makes no sense to print on both sides of a transparency. Such undesired operations in a job description are referred to as conflicts.

Known job programming user interfaces provide some level of conflict checking to avoid user dissatisfaction and prevent wasted materials and time. For example, U.S. Pat. No. 4,814,894 to Yoshida describes a system that automatically reduces the size of an oversized document image on a transmitting side to produce a modified image that will fit onto a selected size recording paper at a receiving side. U.S. Pat. No. 5,260,805 to Barrett describes a printing machine that displays options to a user when it is detected that the image to be printed is oversized for the capability of the printing machine (i.e., a size conflict). For example, a user might be given the option to reduce the image or crop (e.g., cut off) a portion of the image.

However, known machines do not permit customizing the checker with a user defined situation, that is not otherwise a conflict, to be regarded as a conflict by the printing machine's programming conflict checker. The ability for user defined situations to be regarded as a conflict is desirable in a number of instances. For example, when a technician sets the fuser temperature to optimize performance on thicker stocks, a print shop operator with multiple printers might want to force a conflict when a thinner stock is programmed. In this way, the user would move the job to another printing machine that prints thinner stock with good performance. When a print shop operator learns from experience that the performance of certain combinations (e.g., coated papers, inks, sizes, a particular printing device, etc.) is not sufficient to meet his customers expectations, the operator would like to enter the undesirable combination into the job programming user interface to be used by the printing machine's programming conflict checker to force a user defined conflict and prevent wasted materials and time.

SUMMARY OF THE INVENTION

It is an object to the present invention to provide a printer that can be programmed with user defined conflicts. It is a further object of the present invention to provide a printer that can be programmed with conflict information that is not available as a priori information.

These and other objects are achieved in a method to program a printer that includes initiating a save conflict mode and saving a user defined conflict by either storing print job attributes in a conflict list while in the save conflict mode or storing at least one of a policy, a capability and a constraint based on the print job attributes while in the save conflict mode.

One method to use a printer that has been so programmed includes receiving from a user at least one job attribute that causes a conflict, and checking the at least one received job attribute against the stored print job attributes. Another method to use a printer that has been so programmed includes receiving from a user at least one job attribute that causes a conflict and checking for an itinerary to process a sheet according to the at least one received job attribute.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention permits a user to enter new conflict information into a printing machine that specifies a conflict condition that is not known or knowable to the machine from a priori information. In one embodiment, the new conflict information is entered into a user interface, and the user interface checks subsequent job requests against the conflict information so that it will not prepare a job description when the job request conflicts with the newly entered conflict information. Instead, the user interface informs the machine operator of the conflict. In another embodiment, the new conflict information is entered into a user interface so as to cause the user interface to create a new constraint to be incorporated into a model of the machine (MoM). Due to the new constraint, a scheduler of the machine will not schedule an itinerary for processing a sheet (i.e., a print medium) that is contrary to the newly entered information (user specified conflict).

Figure 1:
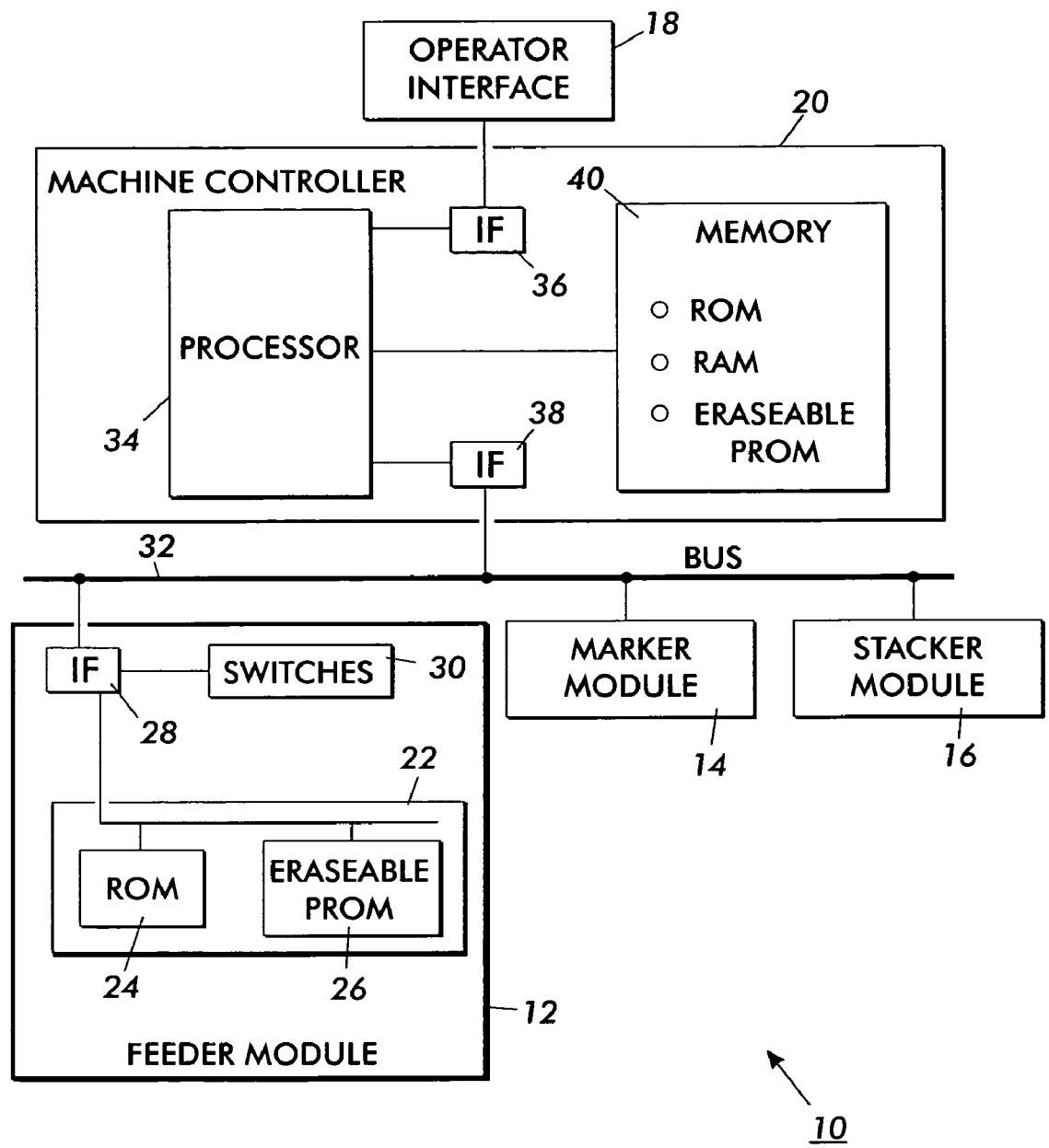
FIG. 1 is a functional block diagram of a printer according to the present invention.

In FIG. 1, printing machine 10 includes multiple modules 12, 14, 16, user interface 18 such as the Mark Facility Interface (generically an operator interface) and machine controller 20. For example, a typical machine includes feeder module 12 to provide sheets to feed into the machine, marker module 14 to mark images onto the sheets and stacker module 16 to stack the output sheets. The printing machine is described by a model of the machine (MoM). Each module is characterized by one or more capability, and each capability is characterized by corresponding constraints. Preferably, all of the modules, capabilities and constraints are described and coded using a Component Description Language (CDL). Each module includes module description memory 22, preferably a memory having read only memory (ROM) 24 and reprogrammable non-volatile flash memory or erasable programmable read only memory 26. Each module includes interface 28 (e.g., a memory controller or a general processor or microprocessor), called Machine Module Interface (MMI) to control access to memory 22, and each module may include one or more micro switches 30 or sensors to sense the state of the module (e.g., an "out of paper" indicator) coupled to interface 28. Using the CDL, each module is completely described, and the description is stored in module description memory 22 for access by the machine controller.

A job description describes a document which includes sheets and their assembly. A system module (called a Mark Facility Interface or MFI) upstream of machine controller 20 reformulates user specified job attributes (e.g., landscape mode, 2 copies, blue cover sheet, etc.) of the job description into an assembly tree. The assembly tree is a description that is input into machine controller 20 from the MFI. Job descriptions and assembly trees are described in U.S. Pat. Nos. 5,604,600 and 5,710,635, incorporated herein by reference. In its simplest form, the parameters of the job description are sent to the machine controller via the MFI. For example, one job might specify A4 sheets to be printed in simplex mode and stacked and stapled.

Figure 2:
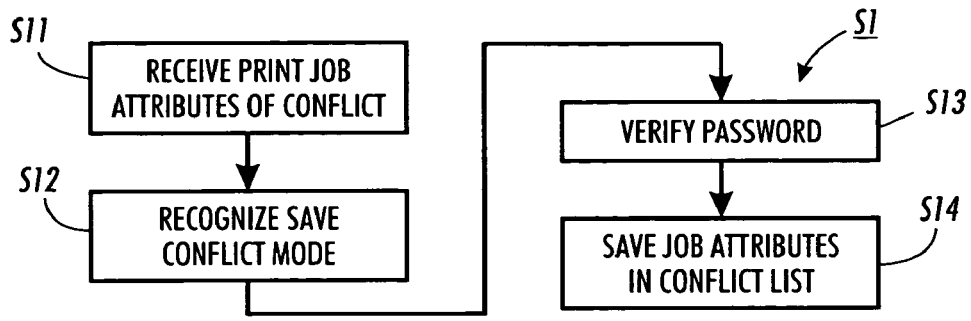
FIG. 2 is a flow chart of a method to enter a conflict in a first embodiment.

In the first embodiment, step S1 (FIG. 2) enters job attributes into a conflict list. In FIG. 2, a user enters the job attributes of a user specified conflict into user interface 18 and the user interface receives the print job attributes of the conflict at step S11. Typical print job attributes include an enlargement/reduction parameter, an orientation, a simplex/duplex parameter, a sort parameter, a binding parameter, and a fed medium select parameter. The user actuates a save conflict mode (e.g., by pressing a predetermined function key or key combination), and user interface 18 recognizes the keys as a command to enter a "save conflict mode" at step S12. To help provide configuration control over the machine, at optional step S113, a user enters a password, and the user interface verifies the password against authorized passwords. Security may be provided by other security measures (e.g., a physical key to operate a switch, a bar coded card, or a magnetic strip on a card or badge, etc.). After the password is verified, at step S14, the user interface enters the user specified job attributes in a conflict list as a user defined conflict condition.

Figure 3:
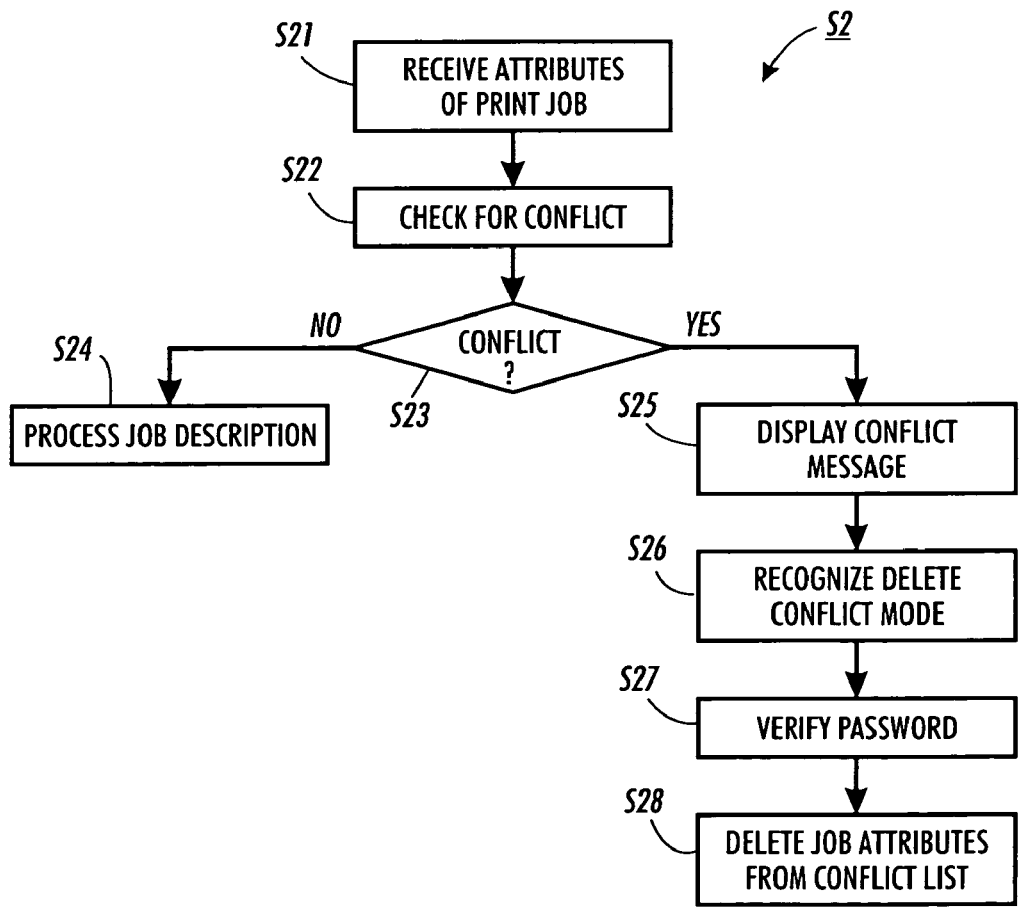
FIG. 3 is a flow chart of a method to delete a conflict in the first embodiment.

In step S2 of FIG. 3, when a subsequent user seeks to define a job by specifying print job attributes, the specified attributes are checked against the conflict list for a match. In step S21, the user interface receives the print job attributes, and in step S22, the user interface checks for a match with a previously entered user defined conflict condition. If no match is found in step S23, the print job is normally processed at step S24. If a match is found at step S23 indicating a conflict condition, a conflict is declared, and the user interface displays a conflict message at step S25 informing the user that the attributes specified are not permitted according to a user specified conflict that was earlier entered. The conflict message preferably informs the user of the options available to clear the conflict. The user may then change some attribute of the print job. Alternatively, the user may actuate a "delete conflict mode" (e.g., by pressing a predetermined function key or key combination), and the user interface recognizes the keys as a command to enter a "delete conflict mode" at step S26. To help provide configuration control over the machine, at optional step S27, a user enters a password, and the user interface verifies the password against authorized passwords. Security may be provided by other security measures (e.g., a physical key to operate a switch, a bar coded card, or a magnetic strip on a card or badge, etc.). After the password is verified, at step S27, the user interface deletes the selected job attributes from the conflict list to remove the user defined conflict condition at step S28.

Figure 4:
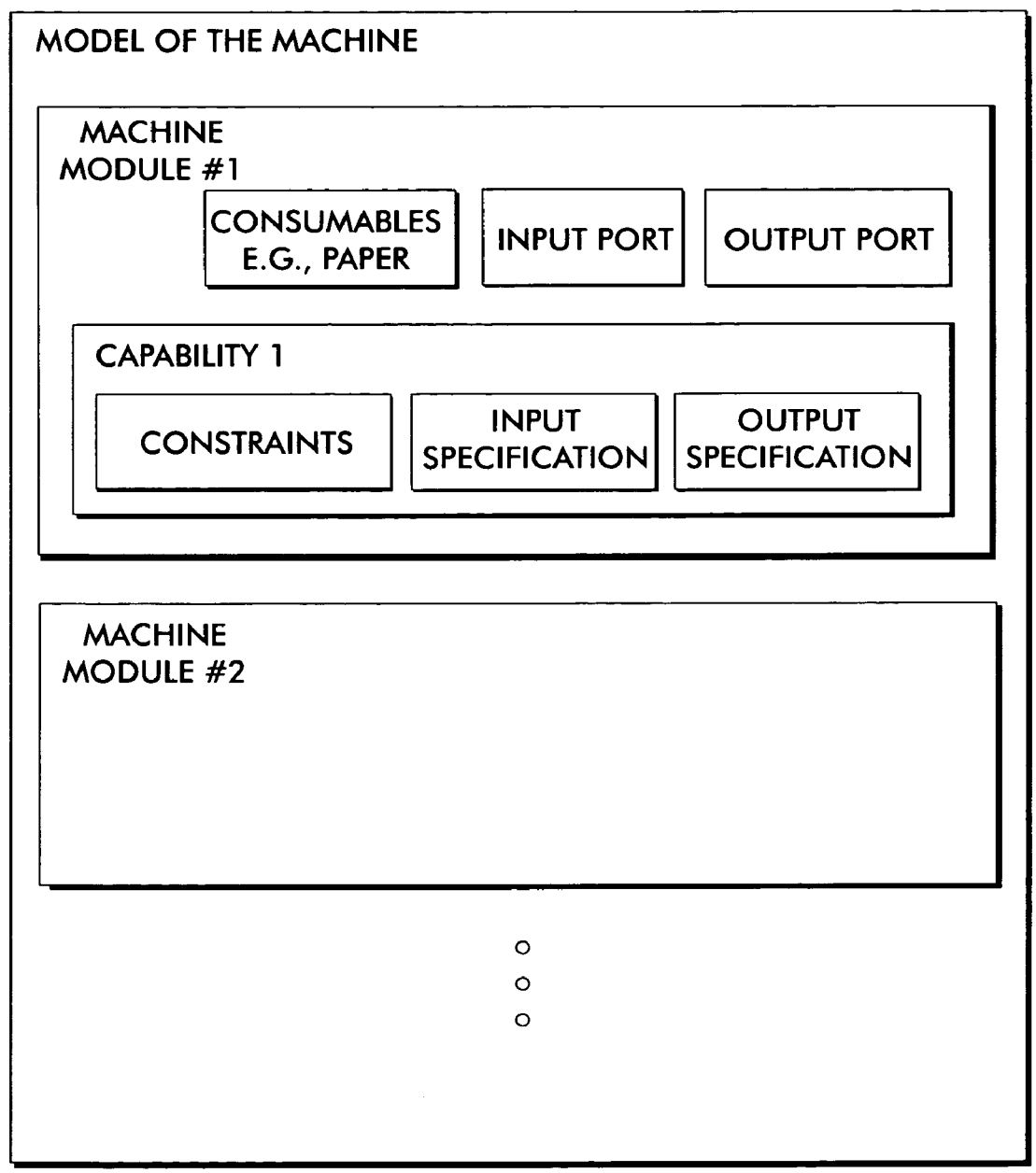
FIG. 4 is a representative machine graph (model of the machine) according to the present invention.

In FIG. 4, the model of the machine (MoM) includes machine module #1 and machine module #2. Machine module #1 includes a list of consumables that it can process, a list of input ports and output ports. Machine module #1 also includes a list of capabilities, and each capability includes constraints (e.g., dimensions) on each consumable that can be processed along with a corresponding input and output specification referenced to the input and output ports.

The feeder module typically includes multiple trays, referred to generically as capabilities, to hold the sheets that can be fed by the feeder. For example, the feeder module may include a tray1 for 8½"×11" sheets, a tray2 for A4 sheets, and an adjustable tray3 to fit sheets of a size between 8½"×13" and 8½"×14". In this exemplary case, the feeder module would have these three capabilities.

Each capability is described in terms of constraints. For example, for tray 1 (8½"×11" sheets), memory 22 might have encoded therein the constraints as "DIM.x=850; DIM.y=1100" or an equivalent code. For tray2 (A4 sheets), memory 22 might encode the constraints as "DIM.x=826; DIM.y=1171" or an equivalent code. For adjustable tray3 (either 8½"×13" or 8½"×14" sheets), memory 22 might encode the constraints as "DIM.x=850; 1300<DIM.y<1400" or an equivalent code to indicate the y length is constrained between 13" and 14". A more universal tray might encode the constraint as "DIM.x=850; 100<DIM.y<1400" or an equivalent code to indicate the y length is constrained between 11" and 14". When constraints are encountered that indicate that the tray dimension is allowed to take on a range of values, machine controller 20 would have to look elsewhere for the final determined value. For example, controller 20 may look to information reported from the flash memory part 26 of the module's description memory 22. When the operator sets a selectable fence in the tray to hold the sheets of the right size in proper alignment, the operator uses another module (a PSIP module) of the printing machine to specify attributes of the sheet (e.g., the sheet size or color). The PSIP module reports these attributes to feeder module 12 via Machine Module Interface 28 (MMI 28). From there, the MMI stores the information in flash memory 26 and informs machine controller 20 about the update of the attributes of the "consumables" (in this case, the paper). Alternatively, micro switch 30 senses the movable fence and indicates the size of the sheets in the tray to MMI 28, and the MMI informs machine controller 20 about the update of the attributes of the "consumables".

A home office may have a printer with one or two trays. A medium size print shop may have a three or four tray feeder module. However, a large print shop may desire more than 20 trays, or 5 or 6 feeder modules, each with several trays. The number of modules in the machine may vary as well as the number of trays in the feeder module. The combinations of sheet sizes, weights and types of sheets (e.g., transparency or paper, paper color, letterhead, tabbed sheets, envelopes, etc) could easily lead to a need for more than 20 trays. Some of the constraints on the tray capabilities, such as sheet size, are inherent characteristics, and these are described in the capability and constraints stored in ROM part 24 of the module's description memory 22.

However, the inherent tray characteristics will not define how the machine operator loads the trays. For example, the color of the paper that is loaded in the tray is not an inherent characteristic of the tray. For these operator imposed constraints on the capability, the operator must personalize the module's constraints. The operator can personalize the sheet weights and types of sheets (e.g., transparency or paper, paper color, letterhead, tabbed sheets, envelopes, etc). The machine operator enters these choices in the machine through another module (a PSIP module) of the printing machine to specify personalizing attributes of the sheets in the trays.

The PSIP is an interface used by the machine operator to personalize the printer, initiate diagnostics, submit jobs, etc. The PSIP module is a software component of the printing system that does processing upstream in the overall work flow of the machine controller. The PSIP module reports the personalizing attributes to feeder module 12 via Machine Module Interface 28 (MMI 28). From there, the MMI stores the information in flash memory 26 and informs machine controller 20 about the update of the attributes of the "consumables".

Similarly, the capabilities and constraints of stacker module 16 will define the patterns of collation and binding or stapling that are available in the stacker module. Capabilities may include specific stacker trays with constraints on their sizes. The stacker module may be capable of stapling in the upper left corner or two times on the left or top margin. Variations may permit the stapling to be done for sheets in landscape or portrait orientation. Advanced capabilities may include other binding techniques, shrink wrapping, various folding formats (as in a newspaper section), etc. The stacker module's capabilities and constraints are described in CDL and stored in the module's description memory.

The capabilities and constraints of marker module 14 will define the printing options that are available from the marker module. For example, the marker module may be capable of printing 8½"×11" or A4 sheets in simplex mode (front side only), duplex mode (front and back arranged for easy reading when bound along a left margin), and inverted duplex mode (front and back with a back sheet inverted for easy reading when bound along a top margin). However, the marker module may be capable of printing "11×17" in simplex mode only. The capabilities of the marker module may include enlarge and reduce features that are defined by constraints on the amount of enlargement or reduction. These capabilities are also described by their constraints using the CDL and stored in the module's description memory.

Each module is connected to machine controller 20 either in a point to point connection or preferably through common bus 32 to which all modules are connected. When the machine is initially powered up, all modules communicate their capabilities and constraints to the controller, and the controller builds a model of the machine. For example, the model for the feeder module might be:

(TRAY1)"DIM.x=850;DIM.y=1100"
(TRAY2)"DIM.x=826; DIM.y=1171"
(TRAY3)"DIM.x=850; 1300<DIM.y<1400"

and stored within the machine controller. Different feeder modules may be used in machines with the same controller since the model of the machine (MoM) is built up each time the machine is powered up. To transfer the contents of the module's description memory to the controller, the controller may poll the several allowable module station addresses and up load the contents if a module station responds. Alternatively, at power up each module may request access to transfer the contents of its description memory, and the controller will resolve conflicting requests and then command the transfer. The total or dynamic model of the machine also includes machine state parameters such as "feeder tray1 empty", marker not ready, or "stacker tray 3 full" that are picked up by sensors or generated by control signals (e.g., ready or not ready) during operation of the individual modules or the machine controller.

Machine controller 20 preferably includes processor 34 (e.g., either a microprocessor or special logic such as may be implemented in one or more ASIC, application specific integrated circuits) and interfaces 36 and 38 to communicate with operator interface 18 and bus 32 respectively. Machine controller 20 also includes memory 40 that may includes ROM, RAM and erasable PROM or flash memory. Memory 40 stores control programs, preferably in the ROM, organized in a plurality of named modules. It will be appreciated by persons skilled in the art that machine controller 20 may be in independent module, a circuit board contained within one of the other modules (e.g., modules 12, 14, 16) or may be a part of a circuit board conveniently implemented anywhere in the machine.

Memory 40 also stores data of one form or another. Permanent data is stored in the ROM and temporary data is stored in the RAM. During the operation of the machine, a model of the machine (MoM) is built and stored, preferably, in the RAM, or part in the RAM and part in an erasable PROM or flash memory (power up). Parameter data that is a result of personalizing operations of the machine operator is typically stored in the erasable PROM or flash memory. Furthermore and as described more fully herein, the machine is shipped with a library of policies, preferably, stored in the ROM. However, a program module, called the Strategy Selector, identifies the policies appropriate for the model of the machine, and stores references to the selected policies, preferably, in the erasable PROM.

Persons skilled in the art will appreciate, in light of these teachings, that other configuration of memory 40 may be configured to support this invention. For example, some or all of the program and data may be stored on a CD-ROM or a magnetic floppy disk, transferred onto a magnetic disk internal to machine controller 20 and from there loaded in RAM.

Machine controller 20 includes a scheduler. The scheduler is a software module that schedules print jobs through the printer. The scheduler includes a model traverser operated at power up time that processes a model of the machine (MoM) to generate a list of valid sheet itineraries. A sheet itinerary is a configuration list of the specific modules and capabilities and constraints that are needed to process the print job. The scheduler also includes a store traverser to process the list of valid sheet itineraries to select one itinerary suitable for processing a desired print job at run time. Both the model traverser and the store traverser use an itinerary validator to check a candidate itinerary against print scheduling policies, typically stored as data files.

A print scheduling policy is a criteria (e.g., if-then-else statements) that a selected itinerary must satisfy to process a print job, where an itinerary for a sheet of the print job is a schedule of the required machine modules, together with the required capability and constraints of the modules, that are necessary to process the sheet. A matching requirement that the properties of a sheet that is output from an itinerary must match the properties of the requested print sheet is an example of a policy. Another example of a print scheduling policy is a policy that favors use of the high capacity feeder, if present, for large jobs, but not for smaller jobs. However, other printers may be designed to have policies that do not favor the high capacity printer, even if present, on larger jobs. In such a case, each product's policies could be different.

At power up and subsequently on command, the scheduler of the printing machine reads the capabilities and constraints of the attached modules, develops and stores an electronic model of the machine (MoM). The MoM is a hierarchical data structure that includes representations for the machine modules, their capabilities, their constraints, etc.

U.S. Pat. No. 5,701,557 to Webster, et al., incorporated herein by reference, describes an image processing apparatus with a controller and plural modules and a method to define a configuration of the image processing machine. U.S. Pat. No. 5,696,893 to Fromherz, et al., incorporated herein by reference, describes a method to model a printing machine specifying a structure model with its physical and software interface and internal resource requirements, and a behavior model to describe capabilities of a component with its description of work units, transformation of work units, timed events, resource allocations, constraints and restrictions.

Figure 5:
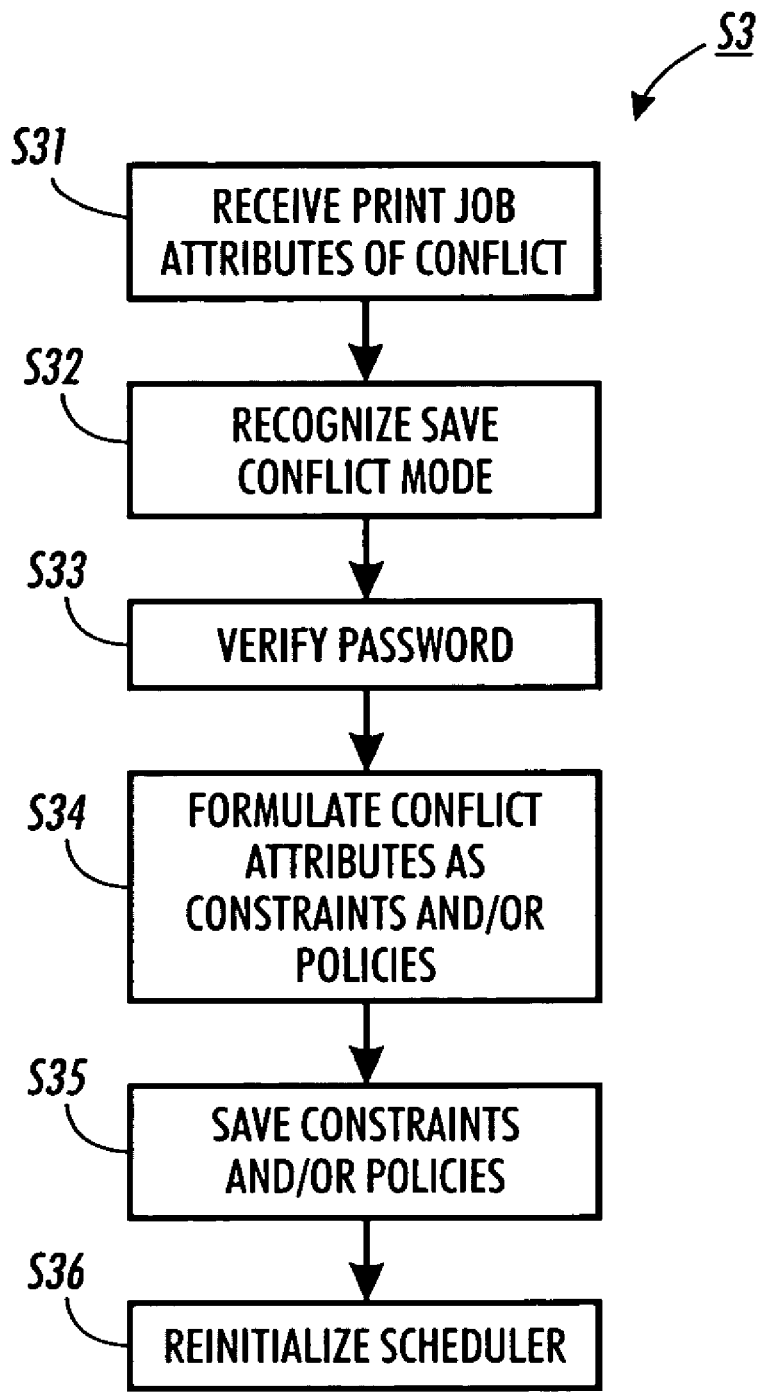
FIG. 5 is a flow chart of a method to enter a conflict in a second embodiment.

The print job description describes the paper size and type to be printed on, whether simplex or duplex printing is required, etc. U.S. Pat. No. 5,710,635 to Webster, et al., incorporated herein by reference, describes a representation of a print job or document and how that representation can be transformed into something that the controller can use to print the job. U.S. Pat. No. 5,604,600 to Webster, incorporated herein by reference, describes a representation of a print job or document that is machine-independent and "print-ready." U.S. Pat. No. 5,129,639 to DeHority, incorporated herein by reference, describes a printer configuration control system that compares the print job requirements to the printer capabilities. In the second embodiment mentioned above, step S3 (FIG. 5) enters job attributes, modifies the model of the machine (MoM), and reinitializes the machine to eliminate itineraries that would create a user specified conflict. In FIG. 5, a user enters the job attributes of a user specified conflict into user interface 18 and the user interface receives the print job attributes of the conflict at step S31. The user actuates a save conflict mode (e.g., by pressing a predetermined function key or key combination), and the user interface recognizes the keys as a command to enter a "save conflict mode" at step S32. To help provide configuration control over the machine, at optional step S33, a user enters a password, and the user interface verifies the password against authorized passwords. Security may be provided by other security measures (e.g., a physical key to operate a switch, a bar coded card, or a magnetic strip on a card or badge, etc.). After the password is verified, the user interface at step S34 reformulates the job attributes as conflict attributes in the form of configuration policies, capabilities of modules, constraints on modules or combinations. These conflict attributes may include policies, capabilities or constraints based on an enlargement/reduction parameter, an orientation, a simplex/duplex parameter, a sort parameter, a binding parameter, a fed medium select parameter, or combinations. At step S35, the user interface loads any new capabilities and constraints into capability/constraint memory 22 (FIG. 1) of one or more applicable modules, and the user interface adds any new policies to the existing list of configuration policies. For example, to avoid duplex printing (two sided) on transparency stock, a new policy is formulated to specify that the feeder tray in the feeder module from which transparency stock is to be fed is not compatible with the duplex printing capability of the marker module. Then, in step S36 (FIG. 5), the scheduler is reinitialized, at least in so far as needed to cause the Model Traverser to build a new list of valid itineraries. In the above example, duplex printing of transparency stock will not be regarded as a valid itinerary.

Figure 6:
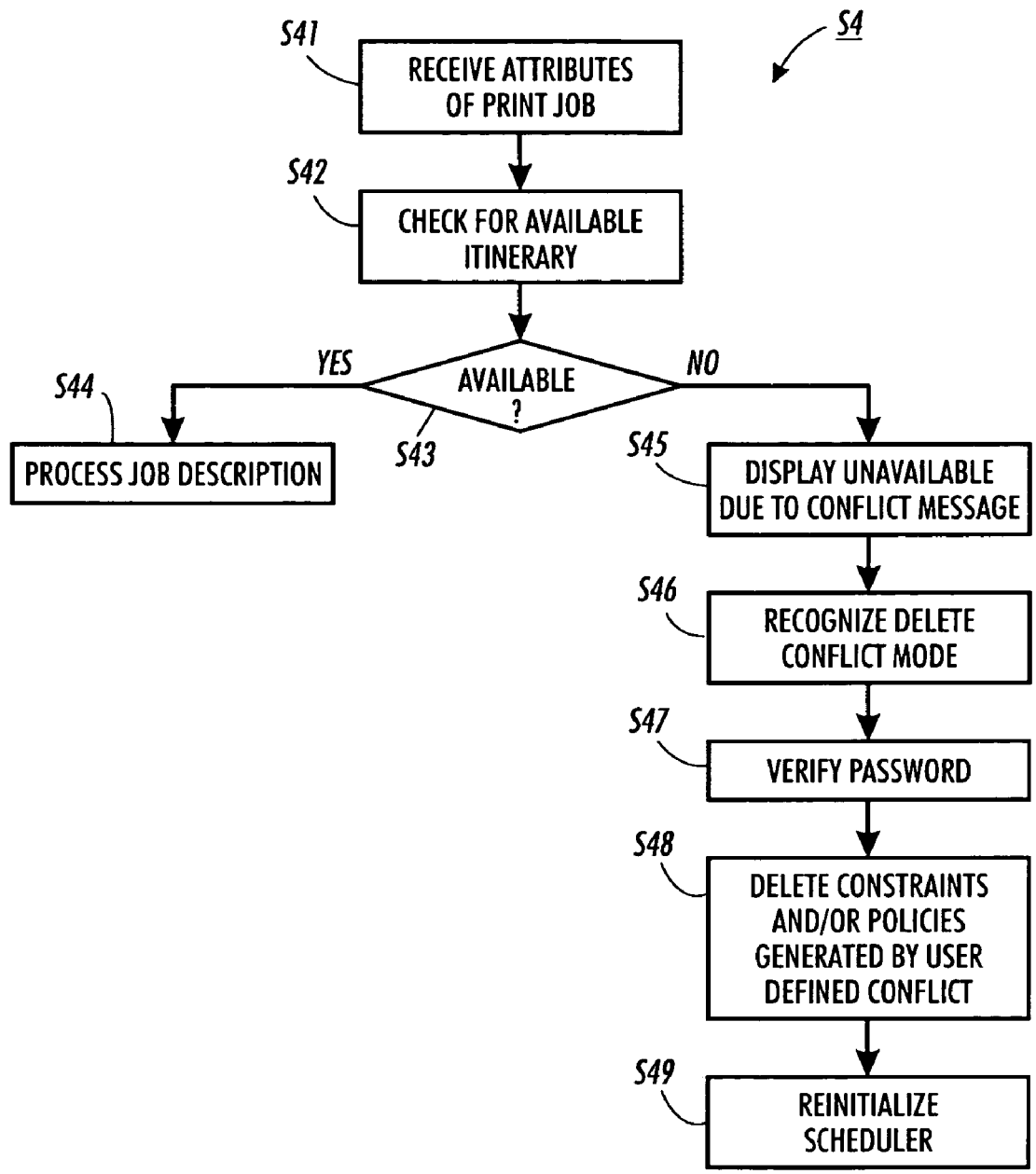
FIG. 6 is a flow chart of a method to delete a conflict in the second embodiment.

In step S4 of FIG. 6, when a subsequent user seeks to define a job by specifying print job attributes, the specified attributes are checked to find an available itinerary to process the print job. In step S41, the user interface receives the print job attributes, and in step S42, the user interface checks for the availability of a print itinerary that will process the requested print job. If an available itinerary is found in step S43, the print job is normally processed at step S44. If no available itinerary if found due to policies, capabilities and/or constraints entered to satisfy a user defined conflict, then no available itinerary is indicated at step S43 indicating a conflict condition, and the user interface displays a conflict message at step S45 informing the user that the attributes specified are not permitted according to a user specified conflict that was earlier entered. The conflict message perferrably informs the user of the options available to clear the conflict. The user may then change some attribute of the print job. Alternatively, the user may actuate a "delete conflict mode" (e.g., by pressing a predetermined function key or key combination), and the user interface recognizes the keys as a command to enter a "delete conflict mode" at step S46. To help provide configuration control over the machine, at optional step S47, a user enters a password, and the user interface verifies the password against authorized passwords. Security may be provided by other security measures (e.g., a physical key to operate a switch, a bar coded card, or a magnetic strip on a card or badge, etc.). After the password is verified, at step S47, the user interface deletes at step S48 the policies, capabilities and/or constraints that were earlier stored to enter the user defined conflict and then reinitializes the scheduler at step S49, at least in so far as needed to cause the Model Traverser to build a new list of valid itineraries.

Discussed above are two preferred examples of how user specified conflict conditions may be entered into a printing machine so that the printing machine will not attempt to print a job specified by the particular attributes of the user specified conflict. It will be appreciated that other means are available to enter the conflict condition into the printing machine that are equivalent. Known printing machines are shipped with conflict resolution logic that is based on the "as shipped" configuration of the machine. Such known machines are not capable of entering a user specified conflict condition that responds to "after shipment" conditions (e.g., the current maintenance or calibration status of the machine, customer preferences, and print shop work flow design).

Having described preferred embodiments of a novel method and apparatus for adding programming conflicts for job programing conflict checking (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims.

What is claimed is:

1. A method to program a printer, comprising:
    initiating a save conflict mode from the printer when a user observes an undesirable result from the printer in a printed output in response to user specified print job attributes; and
    saving a user defined conflict by one of storing the user specified print job attributes in a conflict list while in the save conflict mode and storing user specified conflict attributes based on user specified print job attributes while in the save conflict mode, the user specified conflict attributes including at least one of a policy, a capability and a constraint,
    whereby that combination of attributes is no longer allowed.

2. The method of claim 1, wherein storing print job attributes includes saving at least one of an enlargement/reduction parameter, an orientation, a simplex/duplex parameter, a sort parameter, a binding parameter, and a fed medium select parameter.

3. The method of claim 1, wherein initiating a save conflict mode includes:
    receiving from a user at least one print job attribute that causes a conflict; and
    recognizing a user initiated save conflict mode command.

4. The method of claim 3, wherein initiating a save conflict mode further includes verifying that the user is an authorized user.

5. A method to use a printer that has been programmed according to the method of claim 1, the method comprising:
    receiving from a user at least one job attribute that causes a conflict; and
    checking the at least one received job attribute against the stored print job attributes.

6. The method of claim 5, further comprising:
    determining whether a conflict condition exists; and
    displaying a conflict message when the conflict condition is determined to exist.

7. The method of claim 6, further comprising:
    initiating a delete conflict mode; and
    deleting the stored print job attributes from the conflict list.

8. The method of claim 7, wherein initiating a delete conflict mode includes recognizing a user initiated delete conflict mode command.

9. The method of claim 8, wherein initiating a delete conflict mode further includes verifying that the user is an authorized user.

10. The method of claim 1, wherein storing conflict attributes includes formulating the conflict attributes based on at least one of an enlargement/reduction parameter, an orientation, a simplex/duplex parameter, a sort parameter, a binding parameter, and a fed medium select parameter.

11. The method of claim 10, wherein storing conflict attributes includes reinitializing a scheduler after storing the conflict attributes.

12. A method to use a printer that has been programmed according to the method of claim 1, the method comprising:
    receiving from a user at least one job attribute that causes a conflict; and
    checking for an itinerary to process a sheet according to the at least one received job attribute.

13. The method of claim 12, further comprising:
    determining whether an itinerary is unavailable due to a conflict condition; and
    displaying a conflict message when the itinerary is unavailable due to a conflict condition.

14. The method of claim 13, further comprising:
    initiating a delete conflict mode; and
    deleting the stored conflict attributes.

15. The method of claim 14, wherein initiating a delete conflict mode includes recognizing a user initiated delete conflict mode command.

16. The method of claim 15, wherein initiating a delete conflict mode further includes verifying that the user is an authorized user.

17. The method of claim 14, wherein deleting the stored conflict attributes includes reinitializing a scheduler after deleting the stored conflict attributes.

18. A printer comprising a processor and a plurality of modules to control the processor, wherein the modules include:
    a module that allows a user to initiate a save conflict mode from the printer when the user observes an undesirable result from the printer in a printed output in response to user specified print job attributes; and
    one of a module to store user specified print job attributes in a conflict list while in the save conflict mode and a module to store user specified conflict attributes based on user specified print job attributes while in the save conflict mode, the user specified conflict attributes including at least one of a policy, a capability and a constraint,
    whereby that combination of attributes is no longer allowed.

19. The printer of claim 18, wherein the module to store print job attributes includes logic to save at least one of an enlargement/reduction parameter, an orientation, a simplex/duplex parameter, a sort parameter, a binding parameter, and a fed medium select parameter.

20. The printer of claim 18, wherein the module to initiate a save conflict mode includes:
    logic to receive from a user at least one print job attribute that causes a conflict; and
    logic to recognize a user initiated save conflict mode command.

21. The printer of claim 20, wherein the module to initiate a save conflict mode further includes logic to verify that the user is an authorized user.

22. The printer of claim 18, further comprising:
    a module to receive from a user at least one job attribute that causes a conflict; and
    a module to check the at least one received job attribute against the stored print job attributes, the modules to initiate and store being operated before the module to receive.

23. The printer of claim 22, further comprising:
    a module to determine whether a conflict condition exists; and
    a module to display a conflict message when the conflict condition is determined to exist.

24. The printer of claim 23, further comprising:
    a module to initiate a delete conflict mode; and
    a module to delete the stored print job attributes from the conflict list.

25. The printer of claim 24, wherein the module to initiate a delete conflict mode includes logic to recognize a user initiated delete conflict mode command.

26. The printer of claim 25, wherein the module to initiate a delete conflict mode further includes logic to verify that the user is an authorized user.

27. The printer of claim 18, wherein the module to store conflict attributes includes logic to formulate the conflict attributes based on at least one of an enlargement/reduction parameter, an orientation, a simplex/duplex parameter, a sort parameter, a binding parameter, and a fed medium select parameter.

28. The printer of claim 27, wherein the module to store conflict attributes includes logic to reinitialize a scheduler after storing the conflict attributes.

29. The printer of claim 18, further comprising:
a module to receive from a user at least one job attribute that causes a conflict; and
a module to check for an itinerary to process a sheet according to the at least one received job attribute.

30. The printer of claim 29, further comprising:
a module to determine whether an itinerary is unavailable due to a conflict condition; and
a module to display a conflict message when the itinerary is unavailable due to a conflict condition.

31. The printer of claim 30, further comprising:
a module to initiate a delete conflict mode; and
a module to delete the stored conflict attributes.

32. The printer of claim 31, wherein the module to initiate a delete conflict mode includes logic to recognize a user initiated delete conflict mode command.

33. The printer of claim 32, wherein the module to initiate a delete conflict mode further includes logic to verify that the user is an authorized user.

34. The printer of claim 31, wherein the module to delete the stored conflict attributes includes logic to reinitialize a scheduler after deleting the stored conflict attributes.

35. A computer readable media storing program instructions that control a processor of a printer, the program instructions comprising a plurality of modules to control the processor, wherein the modules include:
a module that allows a user to initiate a save conflict mode from the printer when the user observes an undesirable result from the printer in a printed output in response to user specified print job attributes; and
one of a module to store user specified print job attributes in a conflict list while in the save conflict mode and a module to store user specified conflict attributes based on user specified print job attributes while in the save conflict mode, the user specified conflict attributes including at least one of a policy, a capability and a constraint,
whereby that combination of attributes is no longer allowed.

36. The program instructions of claim 35, wherein the module to store print job attributes includes logic to save at least one of an enlargement/reduction parameter, an orientation, a simplex/duplex parameter, a sort parameter, a binding parameter, and a fed medium select parameter.

37. The program instructions of claim 35, wherein the module to initiate a save conflict mode includes:
logic to receive from a user at least one print job attribute that causes a conflict; and
logic to recognize a user initiated save conflict mode command.

38. The program instructions of claim 37, wherein the module to initiate a save conflict mode further includes logic to verify that the user is an authorized user.

39. The program instructions of claim 35, further comprising:
a module to receive from a user at least one job attribute that causes a conflict; and
a module to check the at least one received job attribute against the stored print job attributes, the modules to initiate and store being operated before the module to receive.

40. The program instructions of claim 39, further comprising:
a module to determine whether a conflict condition exists; and
a module to display a conflict message when the conflict condition is determined to exist.

41. The program instructions of claim 40, further comprising:
a module to initiate a delete conflict mode; and
a module to delete the stored print job attributes from the conflict list.

42. The program instructions of claim 41, wherein the module to initiate a delete conflict mode includes logic to recognize a user initiated delete conflict mode command.

43. The program instructions of claim 42, wherein the module to initiate a delete conflict mode further includes logic to verify that the user is an authorized user.

44. The program instructions of claim 35, wherein the module to store conflict attributes includes logic to formulate the conflict attributes based on at least one of an enlargement/reduction parameter, an orientation, a simplex/duplex parameter, a sort parameter, a binding parameter, and a fed medium select parameter.

45. The program instructions of claim 44, wherein the module to store conflict attributes includes logic to reinitialize a scheduler after storing the conflict attributes.

46. The program instructions of claim 35, further comprising:
a module to receive from a user at least one job attribute that causes a conflict; and
a module to check for an itinerary to process a sheet according to the at least one received job attribute.

47. The program instructions of claim 46, further comprising:
a module to determine whether an itinerary is unavailable due to a conflict condition; and
a module to display a conflict message when the itinerary is unavailable due to a conflict condition.

48. The program instructions of claim 47, further comprising:
a module to initiate a delete conflict mode; and
a module to delete the stored conflict attributes.

49. The program instructions of claim 48, wherein the module to initiate a delete conflict mode includes logic to recognize a user initiated delete conflict mode command.

50. The program instructions of claim 49, wherein the module to initiate a delete conflict mode further includes logic to verify that the user is an authorized user.

51. The program instructions of claim 48, wherein the module to delete the stored conflict attributes includes logic to reinitialize a scheduler after deleting the stored conflict attributes.

* * * * *